(12) United States Patent
Barbre et al.

(10) Patent No.: US 10,549,912 B2
(45) Date of Patent: Feb. 4, 2020

(54) FLOW RACK ASSEMBLIES AND METHODS OF USE

(71) Applicant: Toyota Motor Engineering & Manufacturing North America, Inc., Erlanger, KY (US)

(72) Inventors: Dallas L. Barbre, Geff, IL (US); Michael E. McClarney, Haubstadt, IN (US); Larry J. Gogel, Dale, IN (US); Gregory Y. Harden, Princeton, IN (US); Justin W. Ice, Hazleton, IN (US); Brian L. Sutt, Petersburgh, IN (US); Gary W. Roy, Boonville, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 29 days.

(21) Appl. No.: 15/716,632

(22) Filed: Sep. 27, 2017

(65) Prior Publication Data

US 2019/0092566 A1 Mar. 28, 2019

(51) Int. Cl.
*B65G 1/02* (2006.01)
*B65G 1/08* (2006.01)

(52) U.S. Cl.
CPC .............. *B65G 1/023* (2013.01); *B65G 1/08* (2013.01)

(58) Field of Classification Search
CPC ...... B65G 1/023; B65G 11/086; B65G 1/026; B65G 1/10; B65G 1/12; B65G 1/127; B65G 11/123; B65G 1/08; B65G 47/54; B65G 47/94; A47F 1/12; A47F 5/0025; A47F 5/0093

USPC .... 211/151, 59.2, 162, 119.003; 193/24, 27, 193/36; 198/369.2; 414/286, 529, 414/331.06
See application file for complete search history.

(56) References Cited

U.S. PATENT DOCUMENTS

| | | | |
|---|---|---|---|
| 770,287 A | 9/1904 | Harvey et al. | |
| 1,588,681 A | 6/1926 | Haney et al. | |
| 3,151,576 A | 10/1964 | Patterson | |
| 4,102,448 A | 7/1978 | Wolbrink et al. | |
| 4,476,984 A | 10/1984 | Garrett | |
| 4,555,010 A * | 11/1985 | Solund | B65G 47/94 193/36 |
| 4,709,536 A * | 12/1987 | Hartness | B65B 21/06 53/247 |

(Continued)

*Primary Examiner* — Hiwot E Tefera
(74) *Attorney, Agent, or Firm* — Dinsmore & Shohl LLP

(57) ABSTRACT

A flow rack assembly includes a support structure. A supply track assembly supported by the support structure extends in a longitudinal direction. The supply track assembly declines in elevation from a component supply location to a component pick location. A return track assembly is supported by the support structure that extends in the longitudinal direction. The return track assembly declines in elevation from the component pick location to a tray storage location. A transition support shelf is rotatably connected to the support structure at a pivot location. The transition support shelf is rotatable about the pivot location due to gravity between a component pick configuration that receives component trays from the supply track assembly and a tray transition configuration that delivers component trays to the return track assembly.

19 Claims, 8 Drawing Sheets

(56) References Cited

U.S. PATENT DOCUMENTS

| | | | | |
|---|---|---|---|---|
| 4,977,999 A * | 12/1990 | Smock | ............... | B65G 1/08 |
| | | | | 193/35 SS |
| 5,111,963 A * | 5/1992 | Grace, Sr. | ............... | B65G 1/08 |
| | | | | 193/27 |
| 5,123,517 A * | 6/1992 | Windau | ............... | B65G 35/00 |
| | | | | 193/35 SS |
| 5,314,078 A * | 5/1994 | Morikiyo | ............... | A47F 1/087 |
| | | | | 211/59.2 |
| 5,617,961 A * | 4/1997 | Konstant | ............... | B65G 1/023 |
| | | | | 211/151 |
| 5,735,661 A * | 4/1998 | De Frondeville | ............... | B65G 1/08 |
| | | | | 193/36 |
| 6,095,347 A * | 8/2000 | Mauro-Vetter | ............... | B65G 1/08 |
| | | | | 211/151 |
| 6,132,158 A * | 10/2000 | Pfeiffer | ............... | B65G 1/023 |
| | | | | 193/35 R |
| 6,186,725 B1 * | 2/2001 | Konstant | ............... | B65G 1/08 |
| | | | | 193/36 |
| 6,267,258 B1 * | 7/2001 | Wilkerson | ............... | A47F 5/0025 |
| | | | | 211/119.003 |
| 6,468,015 B1 * | 10/2002 | Konstant | ............... | B65G 1/08 |
| | | | | 193/35 MD |
| 8,230,561 B2 | 7/2012 | Courchesne | | |
| 9,420,900 B1 * | 8/2016 | Simpson | ............... | B65G 1/08 |
| 2002/0104736 A1 * | 8/2002 | Peppel | ............... | B65G 47/647 |
| | | | | 198/369.2 |

* cited by examiner

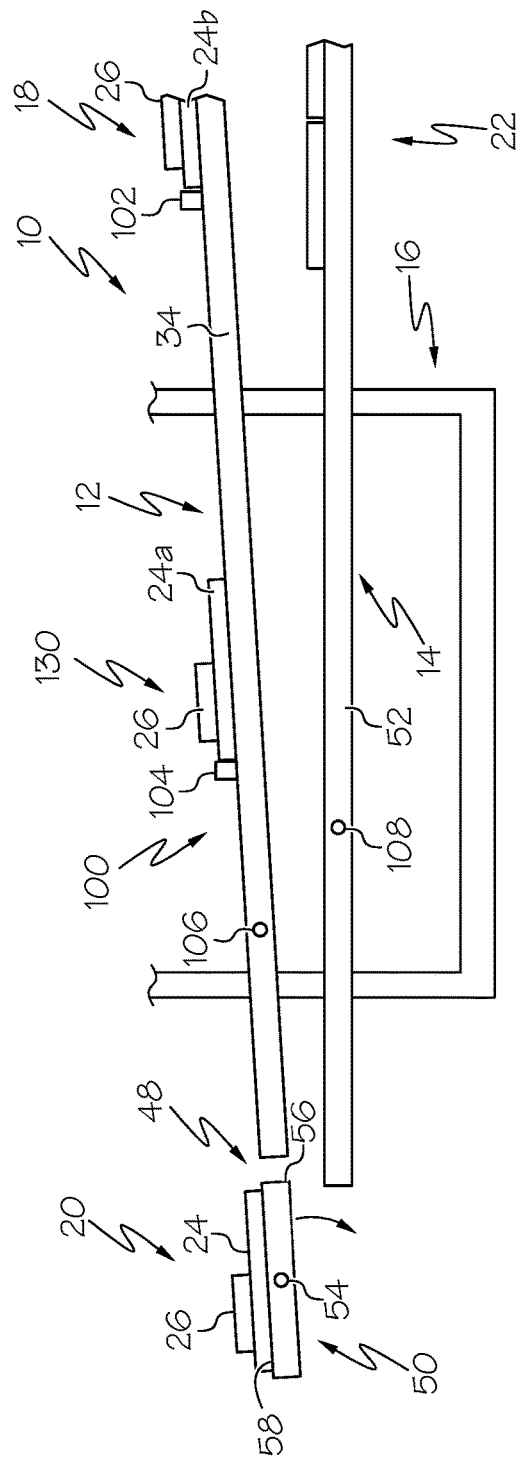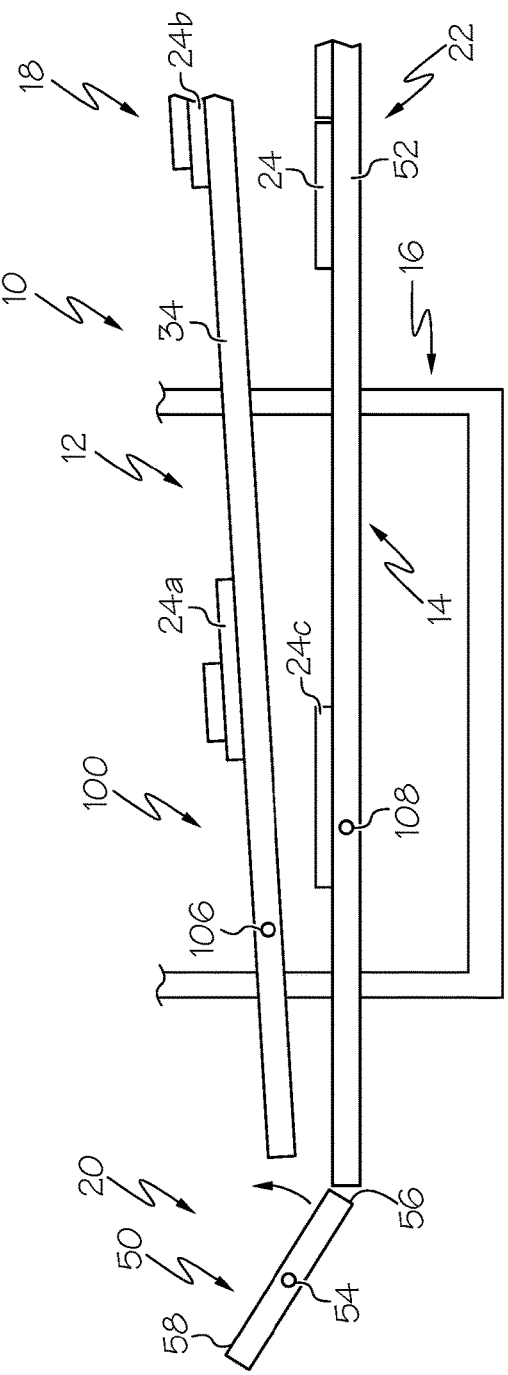

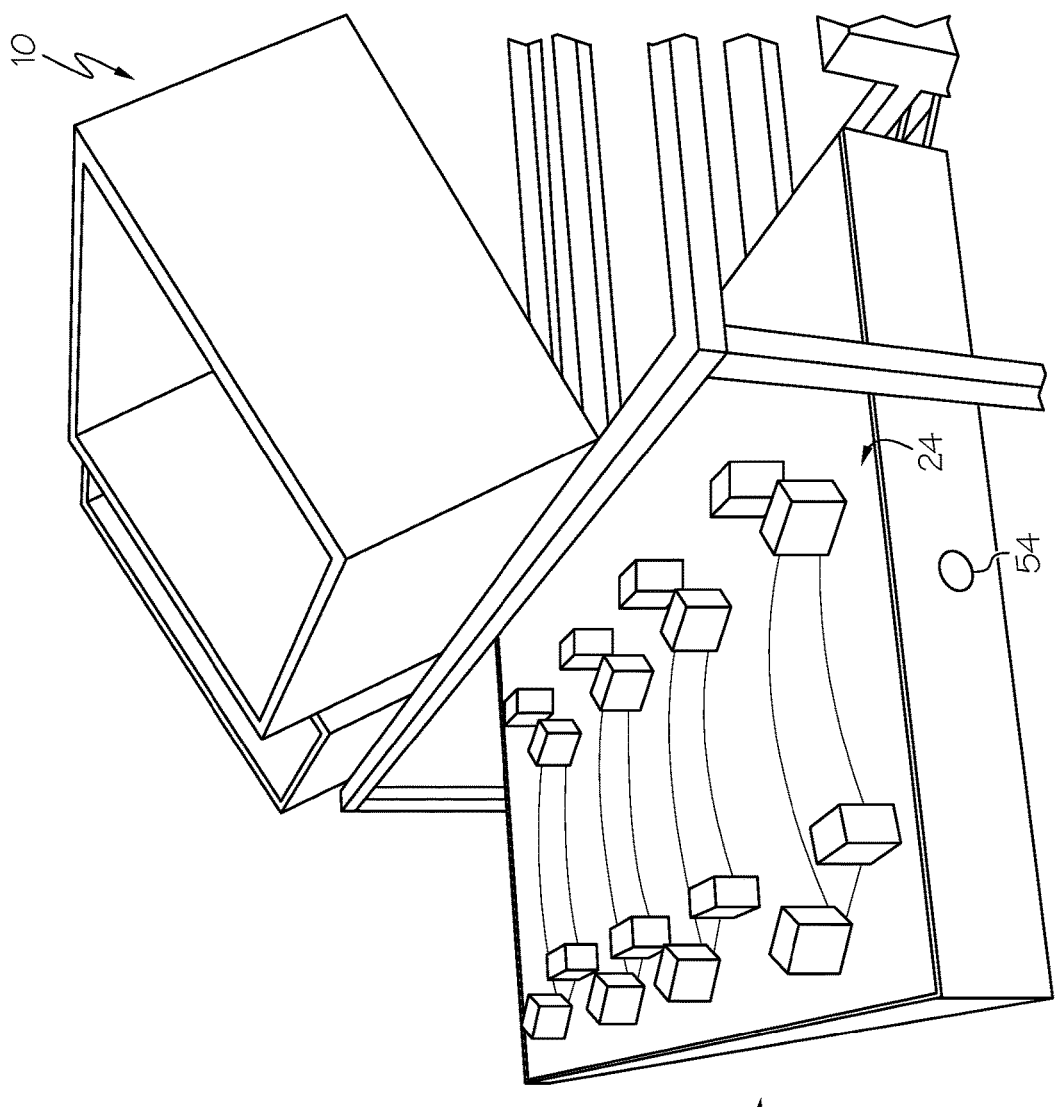
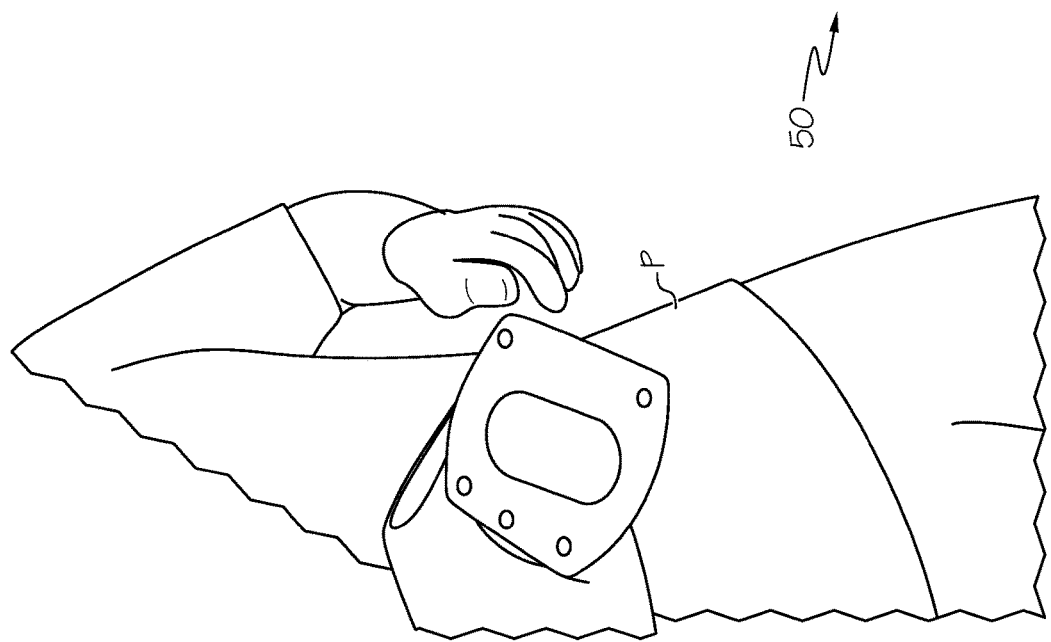
FIG. 6

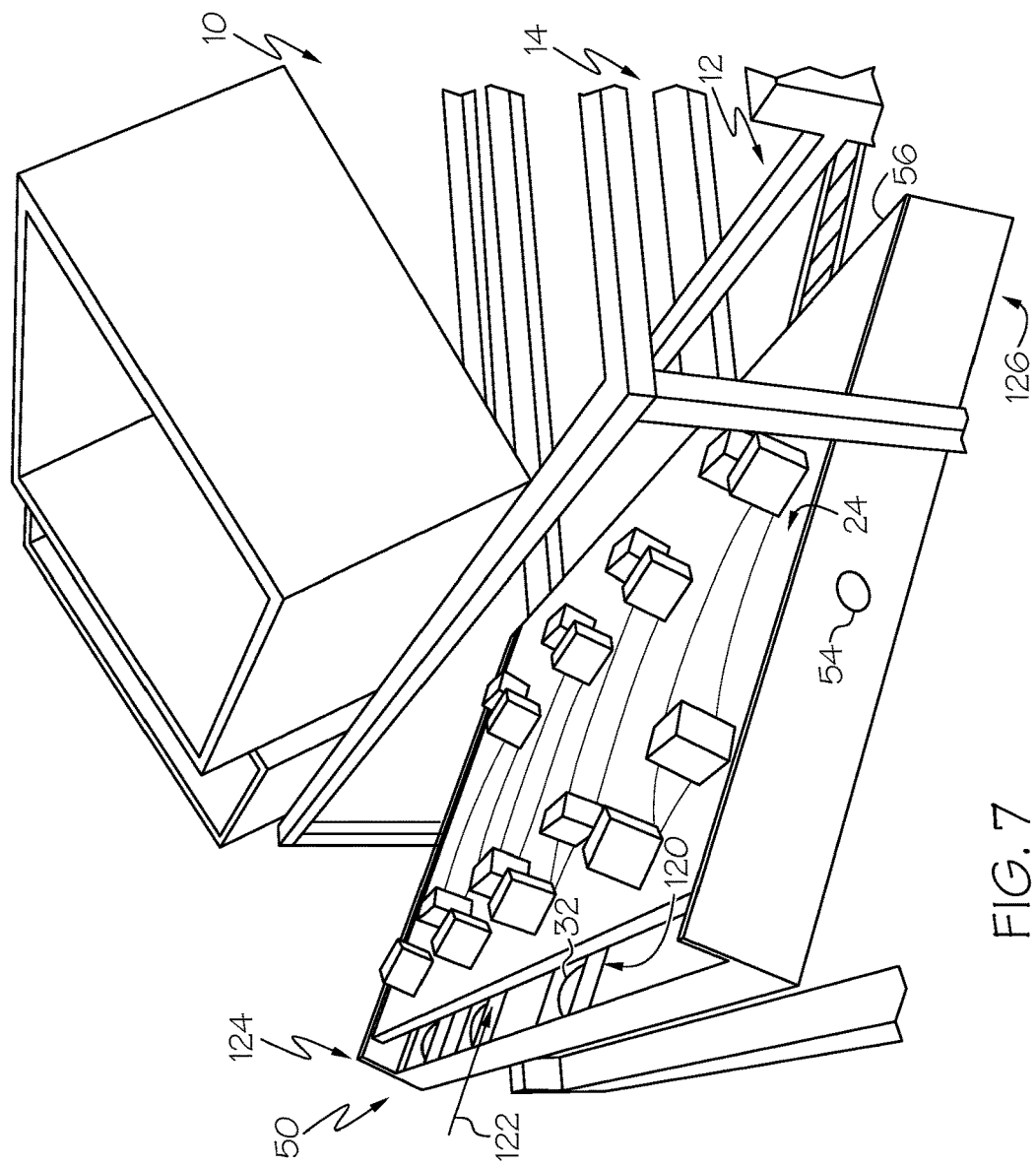
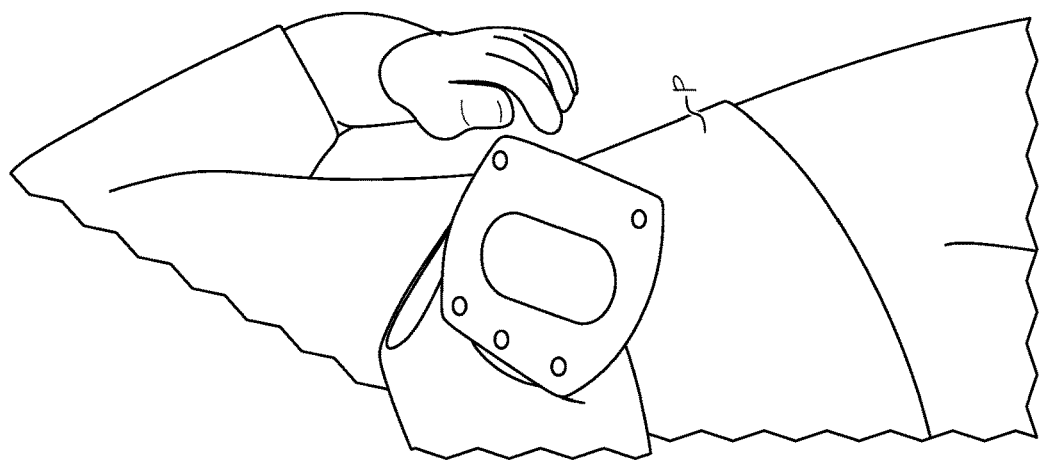
FIG. 7

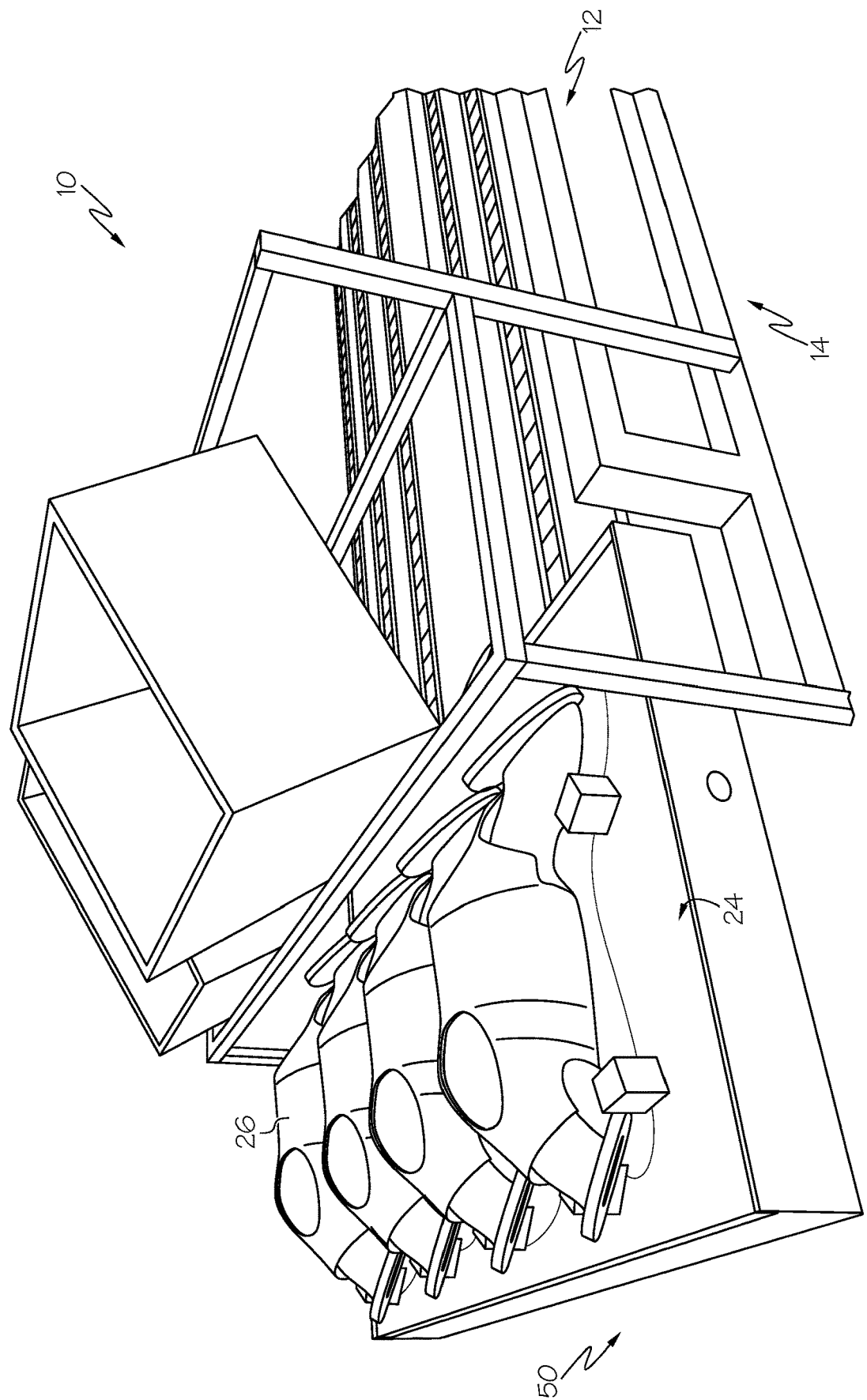

FLOW RACK ASSEMBLIES AND METHODS OF USE

TECHNICAL FIELD

The present specification generally relates to flow rack assemblies that are used to transfer components and, more specifically, to flow rack assemblies that utilize gravity to supply components to an assembly line in a continuous fashion.

BACKGROUND

Flow racks are commonly used to store and/or transfer components, parts, etc. The flow racks may have a plurality of rollers so that components and/or component trays can be moved from one location to another location. Such racks can facilitate movement of the components and/or component trays from one location to another.

Plants, warehouses and other locations have their own space limitations or constraints. Flow racks may be designed to take into account such space constraints. Human factors and efficiencies may also be considered. Typical flow racks may use electrical power to drive the transfer of components.

Accordingly, a need exists for flow rack assemblies that utilize gravity without electrical power to transfer components from one location to another, and to also operate in a continuous fashion.

SUMMARY

In one embodiment, a flow rack assembly includes a support structure. A supply track assembly supported by the support structure extends in a longitudinal direction. The supply track assembly declines in elevation from a component supply location to a component pick location. A return track assembly is supported by the support structure that extends in the longitudinal direction. The return track assembly declines in elevation from the component pick location to a tray storage location. A transition support shelf is rotatably connected to the support structure at a pivot location. The transition support shelf is rotatable about the pivot location due to gravity between a component pick configuration that receives component trays from the supply track assembly and a tray transition configuration that delivers component trays to the return track assembly.

In another embodiment, a method of supplying components for an assembly operation using a flow rack is provided. The method includes placing components on component trays and locating the component trays with the components at a component supply location. At least one of the component trays with at least one component from the component supply location along a supply track assembly is directed toward a component pick location using gravity. The at least one component tray with the at least one component removed is directed using a transition support shelf that is rotatably connected to a support structure at a pivot location. The transition support shelf is rotatable about the pivot location due to gravity between a component pick configuration that receives the at least one component tray from the supply track assembly and a tray transition configuration that delivers the at least one component tray to a return track assembly.

In another embodiment, a flow rack assembly includes a support structure. A supply track assembly is supported by the support structure that extends in a longitudinal direction. The supply track assembly declines in elevation from a component supply location to a component pick location. A return track assembly is supported by the support structure that extends in the longitudinal direction. The return track assembly declines in elevation from the component pick location to a tray storage location. A transition support shelf is rotatably connected to the support structure at a pivot location. The transition support shelf is rotatable about the pivot location due to gravity from a tray transition configuration that delivers component trays to the return track assembly to a component pick configuration that receives component trays from the supply track assembly once a component tray is removed from the transition support shelf.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 is a diagrammatic view of a gravity fed flow rack according to one or more embodiments shown and described herein;

FIG. 2 is another diagrammatic view of the flow rack of FIG. 1 according to one or more embodiments shown and described herein;

FIG. 6 is another perspective view of the of the flow rack assembly of FIG. 3 with the transition support shelf beginning rotation from the component pick configuration to a tray transition configuration under the influence of gravity according to one or more embodiments shown and described herein;

FIG. 7 illustrates the transition support shelf of FIG. 6 rotated to the tray transition configuration according to one or more embodiments shown and described herein;

FIG. 9 illustrates the transition support shelf of FIG. 8 in the component pick configuration supporting a component tray thereon for a picking operation according to one or more embodiments shown and described herein.

DETAILED DESCRIPTION

Figure 3:
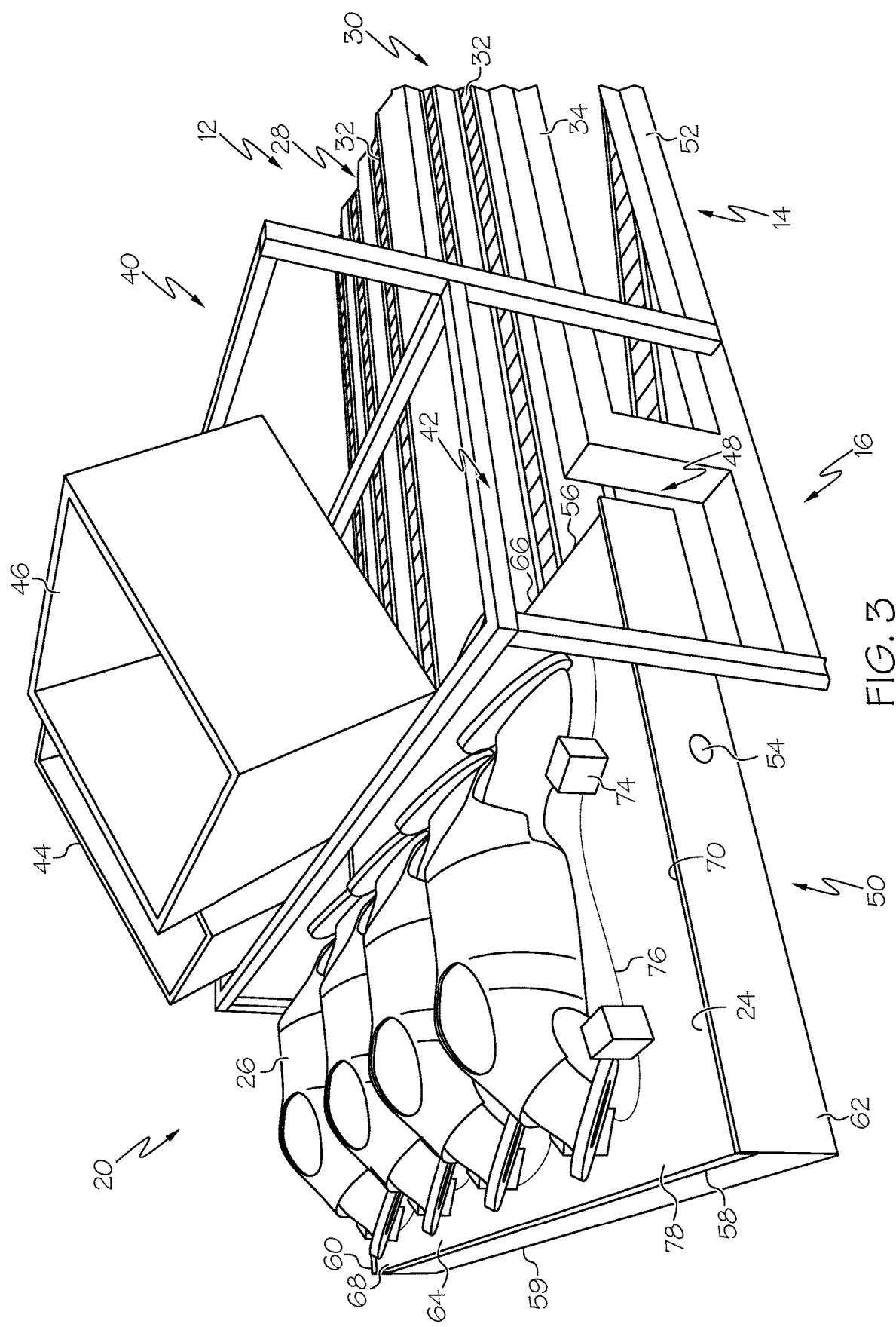
FIG. 3 is a perspective view of the flow rack assembly of FIG. 1 with a transition support shelf in a component pick configuration according to one or more embodiments shown and described herein.

Embodiments described herein generally relate to flow rack assemblies that supply components to an assembly line in a continuous fashion. The flow rack assemblies utilize gravity to continuously supply the components on component trays without use of electrical power. The flow rack assemblies include a supply track assembly and a return track assembly. The supply track assembly feeds component trays with components placed thereon from a component supply location operatively connected to the supply track assembly to a component pick location. The return track assembly feeds empty component trays from the pick location to a tray return location. A transition support shelf is located between the supply track assembly and the return track assembly. The transition support shelf is moveable between a component pick configuration and a tray transition configuration. In the component pick configuration, the transition support shelf supports a component tray thereon in a relatively horizontal position so that an operator can access the components supported by the component tray. As will be described in greater detail below, once the components are removed from the component tray, the weight of the component tray causes the transition support shelf to pivot toward the return track assembly to deliver the empty component tray to the return track assembly where gravity causes the component tray to travel along the return track assembly toward a tray storage location. At the tray storage location, the component trays can be accessed and resupplied with components and then placed back into the component supply location.

Referring to FIG. 1, a flow rack assembly 10 includes an upper supply track assembly 12 and a lower return track assembly 14. As shown, both the supply track assembly 12 and the return track assembly 14 may be linear; however, the supply track assembly and the return track assembly may include one or more curves or turns. A support structure 16 is provided that supports the supply track assembly 12 and the return track assembly 14 in their illustrated positions. In the illustrated example, the supply track assembly 12 declines at an angle $\theta_1$ to horizontal from a component supply location 18 to a component pick location 20 and the return track assembly 14 declines at an angle $\theta_2$ to horizontal from the component pick location 20 to a tray storage location 22. In some embodiments, the angles $\theta_1$ and $\theta_2$ may different. In other embodiments, $\theta_1$ and $\theta_2$ may be the same. In either case, the angles $\theta_1$ and $\theta_2$ are selected to allow a component tray 24 to move along the supply track assembly 12 with a component 26 thereon and to move along the return track assembly 14 without a component thereon after the component or components 26 are removed.

Referring to FIG. 3, the supply track assembly 12 includes a first rail structure 28 and a second rail structure 30 that is adjacent to the first rail structure 28. The first rail structure 28 and the second rail structure 30 may be parallel and extend along a length of the supply track assembly 12 from the component supply location 18 to the component pick location 20. In some embodiments, the first rail structure 28 and the second rail structure 30 may include rollers 32 that are arranged side-by-side in rows along the length of the supply track assembly 12. Guide rails 34 may be provided that can provide lateral guides in the cross-movement direction. As used herein, the term "longitudinal direction" refers to the direction of movement of the component trays 24 along the lengths of the supply track assembly 12 and the return track assembly 14 and the term "lateral direction" refers to the cross-movement direction which is perpendicular to the longitudinal direction.

As shown in FIG. 3, the supply track assembly 12 may include a rack structure 40 that can include a support portion 42 that can be used to support part bins 44 and 46. The part bins 44 and 46 may be provided to store parts that may be used in assembling the components 26. For example, the parts may be picked along with the components 26 for an assembly operation. The rack structure 40 may span a gap 48 (FIG. 1) provided between the supply track assembly 12 and a transition support shelf 50 so that only a portion of the rack structure 40 extends over the transition support shelf 50. Such an arrangement of the rack structure 40 extending only partially over the transition support shelf 50 allows the components 26 to be exposed alongside the rack structure 40 for a picking operation.

The return track assembly 14 extends away from the transition support shelf 50. In some embodiments, the return track assembly 14 may also include the rollers 32 in a fashion similar to that of the supply track assembly 12. In other embodiments, the return track assembly 14 may not include the rollers 32 and the empty component tray 24 may slide along guide rails 52 toward the tray storage location 22 after the components are removed 26.

The transition support shelf 50 is rotatably connected to the support structure 16 at a pivot location 54. The pivot location 54 may provide an axis of rotation that allows the transition support shelf 50 to rotate thereabout between a component pick configuration (FIG. 1) and a tray transition configuration (FIG. 2). The gap 48 is provided of sufficient dimension in the longitudinal direction to allow clearance for the transition support shelf 50 to rotate as shown by FIG. 2 from the component pick configuration with an infeed edge 56 of the transition support shelf 50 adjacent to the supply track assembly 12 to the tray transition configuration with the infeed edge 56 adjacent to the return track assembly 14. Additionally, with the transition support shelf 50 in the tray transition configuration, a support surface 58 of the transition support shelf 50 is located at an angle to horizontal, providing a slope so that gravity can be used to move the component tray 24 from the support surface 58 to the return track assembly 14.

Referring to FIG. 3, the transition support shelf 50 is generally rectangular in shape and includes the infeed edge 56, a front edge 59 opposite the infeed edge 56 and side edges 60 and 62 that extend between the infeed edge 56 and the front edge 59 in the longitudinal direction. The support surface 58 of the transition support shelf 50 extends between the edges 64, 66, 68 and 70 and supports the component tray 24. The side edges 60 and 62 are pivotally connected to the support structure 16 at the pivot location 54. In some embodiments, the pivot location 54 may be offset from a geometric centerline of the side edges 60 and 62 and/or center of mass of the transition support shelf 50. In other embodiments, the pivot location 54 may be located at the geometric centerline of the side edges 60 and 62. While a rectangular shape transition support shelf 50 is illustrated, the transition support shelf 50 may be any other suitable shape, such as rounded, irregular, and combinations thereof.

The transition support shelf 50 is sized and shaped to accommodate the component tray 24. The component tray 24 may also be rectangular in shape and includes a front edge 64, a rear edge 66 and side edges 68 and 70 that extend between the front edge 64 and the rear edge 66. In the illustrated embodiment, a support surface 78 extends between the edges 64, 66, 68 and 70 and is sized to accommodate multiple components 26, such as vehicle components used in assembling a vehicle. In some embodiments, positioning articles 74 may be provided on the support surface 78. The positioning articles 74 may be any suitable shape, such as foam, plastic, rubber blocks. The positioning articles 74 extend outwardly from the support surface 78 and are used to reliably position the components 26 on the support surface 78 in a repeated fashion. In some embodiments, the positioning articles 74 may be formed as part of the support surface 78 or may be formed separately and attached to the support surface 78. Indicia 76 may also be provided on the support surface 78 as an aid in accurately positioning the components 26 on the support surface 58. Properly positioning the articles 26 on the support surface 78 can reliably distribute the weight of the component tray 24 to facilitate operation of the flow rack assembly 10.

FIG. 2 illustrates the transition support shelf 50 in the tray transition configuration with the support surface 58 tilted at the angle to horizontal toward the return track assembly 14. Once the components 26 are removed from the component tray 24, the weight of the component tray 24 and/or location of the pivot location 54 causes the transition support shelf 50 to rotate toward the return track assembly 14. Once the component tray 24 is removed from the transition support shelf 50, the weight and/or location of the pivot location 54 of the transition support shelf 50 causes the transition support shelf 50 to rotate back to the original, component pick configuration shown by FIG. 1.

Referring again to FIGS. 1 and 2, the flow rack assembly 10 includes a flow control system, generally indicated as element 100 that is used to control movement of the component trays 24 through the supply track assembly 12. The flow control system 100 includes an infeed stop mechanism 102 and an on-deck stop mechanism 104. The infeed stop mechanism 102 has an extended configuration that obstructs the supply track assembly 12 thereby inhibiting movement of component trays 24 from the component supply location 18 and a retracted configuration that allows movement of the component trays 24 from the component supply location 18 under the influence of gravity.

The flow control system 100 further includes switch devices 106 and 108. The switch devices 106 and 108 are used to control operation of the stop mechanisms 102 and 104. The switch device 106 is located in the travel path of the supply track assembly 12 such that a component tray 24 can actuate the switch device 106 as the component tray 24 travels along the supply track assembly 12. The switch device 108 is located in the travel path of the return track assembly 14 such that a component tray 24 can actuate the switch device 108 as the component tray 24 travels along the return track assembly 14. Actuation of the switch devices 106 and 108 extends and retracts the stop mechanisms 102 and 104, respectively. Any suitable switch devices 106 and 108 may be used, such as pneumatic valve switches. A pressurized air source may be operatively connected to the stop mechanisms 102 and 104 and the switch devices 106 and 108 that can be used to extend and retract the stop mechanisms 102 and 104.

Figure 4:
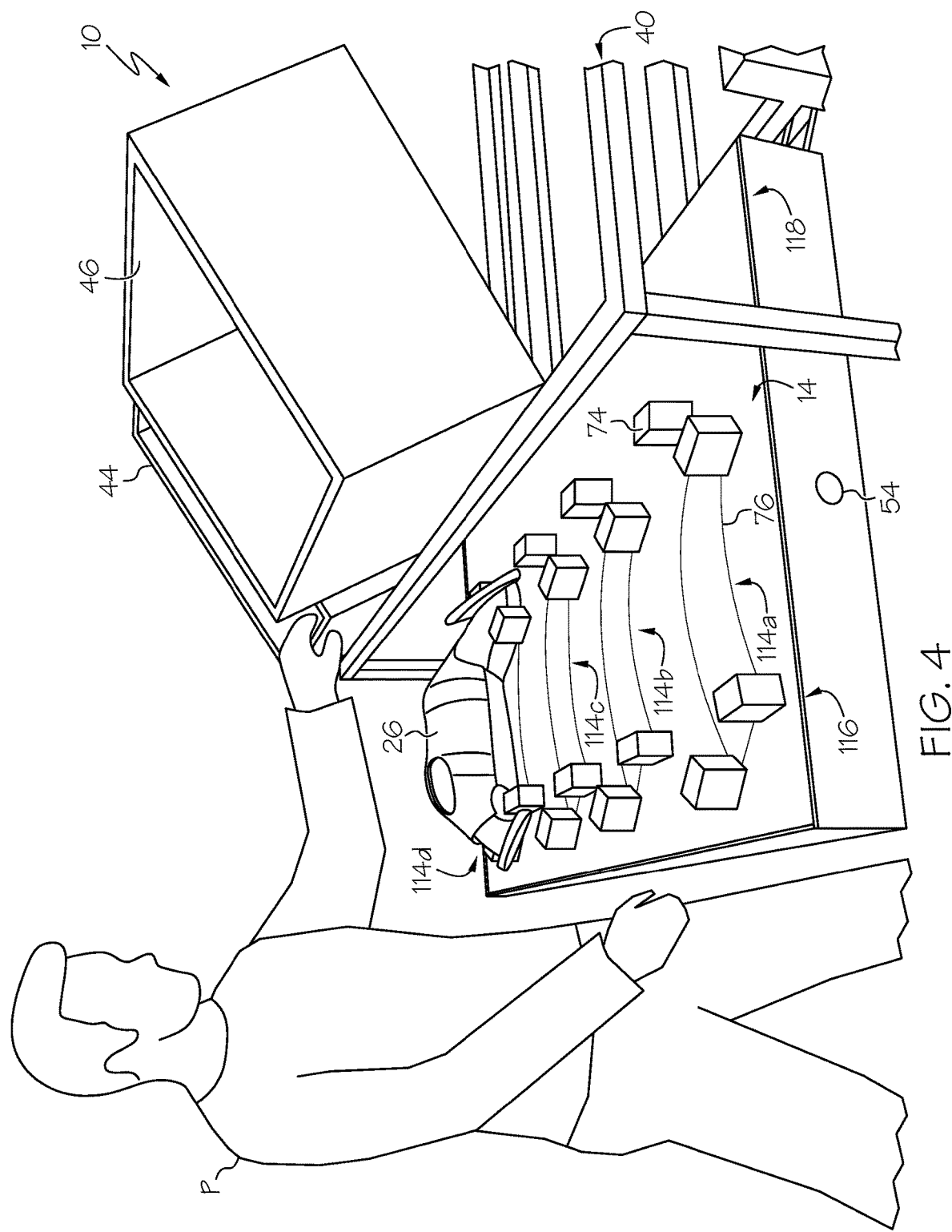
FIG. 4 is a perspective view of the flow rack assembly of FIG. 3 with some components of a component tray removed according to one or more embodiments shown and described herein.

FIGS. 4-9 illustrate operation of the flow rack assembly 10. Referring first to FIG. 4, an operator P may pick parts from the part bins 44 and/or 46 as needed in the assembly operation. As discussed above, the part bins 44 and 46 are supported on the rack structure 40 so that the part bins 44 and 46 overhang only a portion of the component tray 24 thereby exposing the components 26 to the operator P during the picking operation.

The component tray 24 is illustrated as already positioned on the transition support shelf 50. The components 26 are exposed to allow the operator P to pick the individual components 26 from the component tray 24. In this example, components 26 are removed from component locations 114a, 114b, 114c. The component locations 114a, 114b and 114c may be defined using the positioning articles 74 and the indicia 76 in the form of the components 26.

Figure 5:
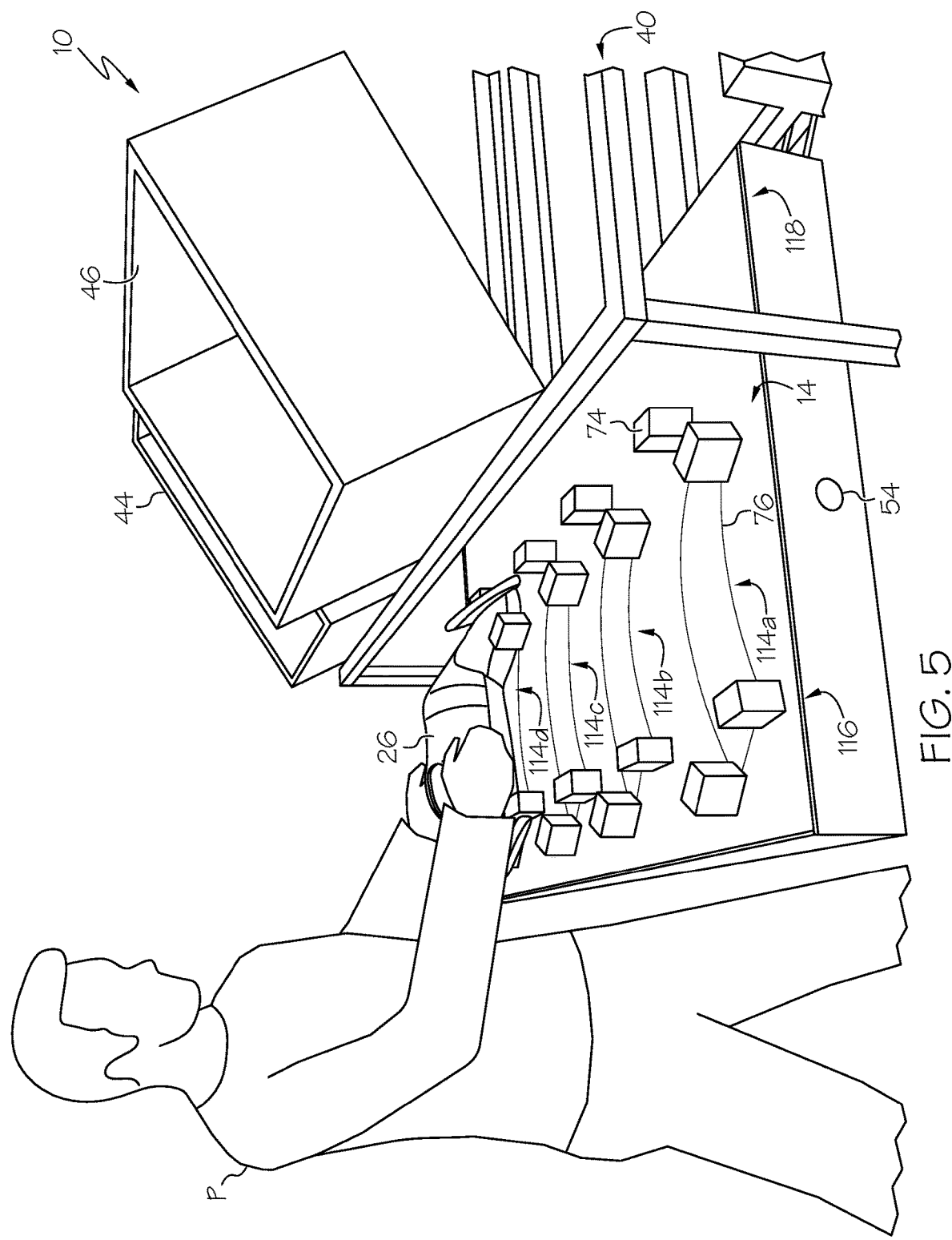
FIG. 5 is another perspective view of the flow rack assembly of FIG. 3 with a remaining component being removed according to one or more embodiments shown and described herein.

Referring also to FIG. 5, the component locations 114a, 114b, 114c and 114d are oriented forward of a laterally extending centerline of the component tray 24. The components 26 provide added weight to a front portion 116 of the component tray 24, which counteracts a rear-weighted portion 118 located upstream of the pivot location 54. In some embodiments, the rear portion 118 of the component tray 24 upstream of the pivot location 54 may be weighted slightly more (e.g., no more than about 25 percent more, such as no more than about 20 percent more, such as no more than about 15 percent more, such as no more than about 10 percent more, such as no more than about 5 percent more, such as between about 5 percent more and about 25 percent more) than the front portion 116 located downstream of the pivot location 54 to provide a controlled pivoting reaction once the final component 26 is removed from the component tray 24. This rear-weighted arrangement can place the center of mass of the component tray 24 on an upstream side of the pivot location.

Referring now to FIGS. 6 and 7, the component tray 24 is illustrated with all of the components 26 removed. With the component tray 24 empty, the transition support shelf 50 automatically begins to rotate about the pivot location 54 without any manual input. Referring to FIG. 7, the transition support shelf 50 rotates such that the infeed edge 56 moves away from the supply track assembly 12 and toward the return track assembly 14. The degree of rotation between the component pick configuration and the tray transition configuration may be selected to allow a smooth transition of the component tray 24 from the transition support shelf 50. For example, the transition support shelf 50 may rotate between about 20 degrees and about 50 degrees between the component pick configuration and the tray transition configuration. In some embodiments, the transition support shelf 50 may include rail structures 120 that may include rollers 32 that are arranged in side-by-side rows along a length of the transition support shelf 50. These rollers 32 can aid in moving the component tray 24 in the longitudinal direction toward the return track assembly 14, as represented by arrow 122.

The transition support shelf 50 may be front-weighted at a front portion 124 downstream of the pivot location 54 slightly more (e.g., no more than about 25 percent more, such as no more than about 20 percent more, such as no more than about 15 percent more, such as no more than about 10 percent more, such as no more than about 5 percent more, such as between about 5 percent more and about 25 percent more) than a rear portion 126 located upstream of the pivot location 54 to provide a controlled pivoting reaction once the component tray 24 is removed from the transition support shelf 50. In other words, the transition support shelf 50 may be loaded in an opposite sense than the component tray 24. Such a front end loaded arrangement can place a center of mass of the transition support shelf 50 at a downstream side of the pivot location 54. To this end, the transition support shelf 50 automatically begins to rotate about the pivot location 54 without any manual input back toward the component pick configuration in line with the supply track assembly 12 to receive another component tray 24 full of components 26. The support structure 16 may provide a stop that supports the transition support shelf 50 in the component pick configuration, thereby preventing over rotation of the transition support shelf 50. In some embodiments, the transition support shelf 50 may be biased toward the component pick configuration, for example, using a spring.

Figure 8:
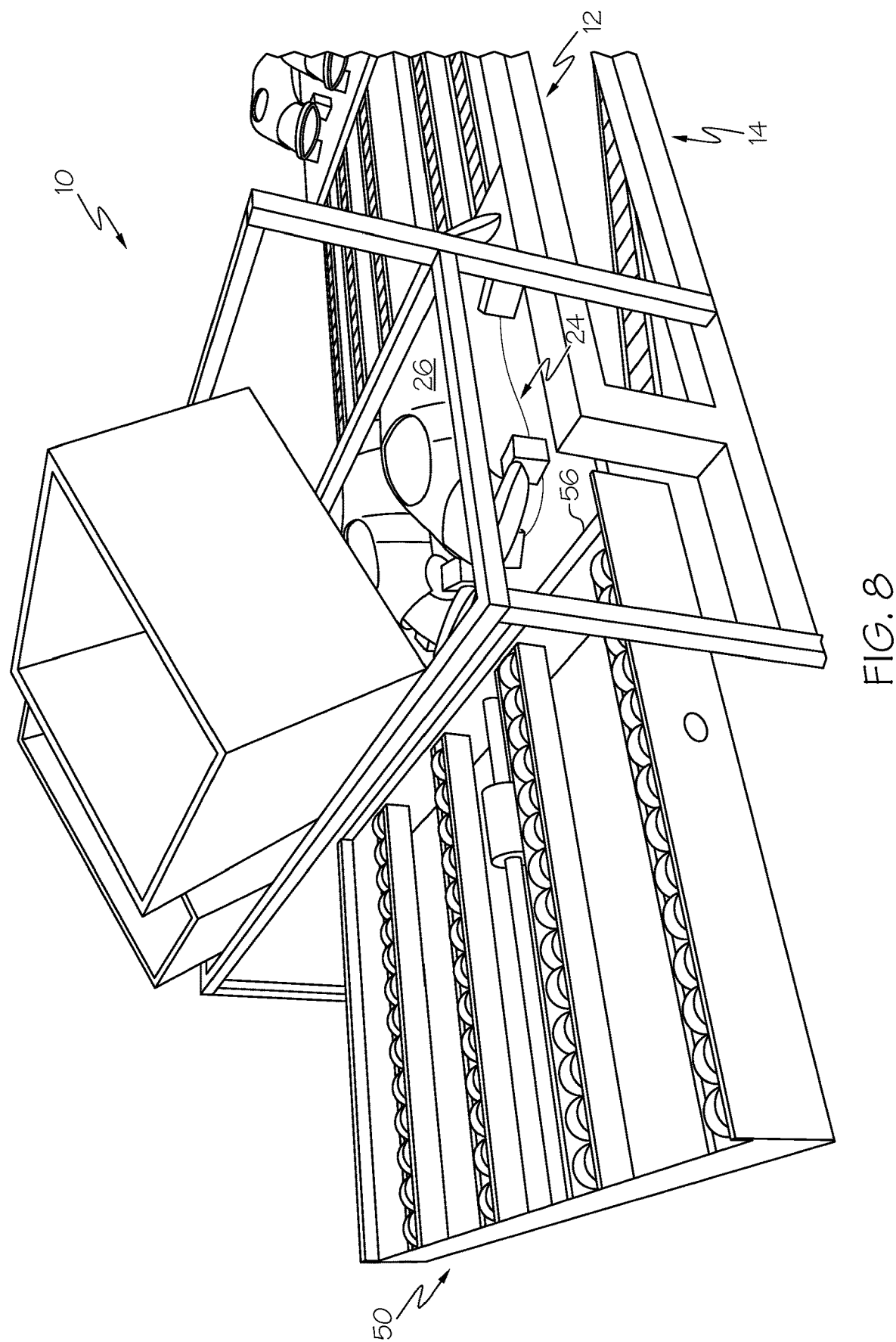
FIG. 8 illustrates the transition support shelf of FIG. 6 rotated back to the component pick configuration under the influence of gravity for receiving another component tray with components according to one or more embodiment shown and described herein.

Referring now to FIGS. 8 and 9, the transition support shelf 50 is again illustrated in the component pick configuration after rotating from the tray transition configuration. In the component pick configuration, the transition support shelf 50 can again receive component trays 24 with components 26 located thereon as the infeed edge 56 is again aligned with the supply track assembly 12.

Referring back to FIG. 1, as the components 26 are picked from the component tray 24 located on the transition support shelf 50, other component trays 24 with components 26 are held in queue using the flow control system 100 with the infeed stop mechanism 102 and the on-deck stop mechanism 104. In particular, a component tray 24a with components 26 is held at an on-deck location 130 by the on-deck stop mechanism 104 and another component tray 24b with components 26 is held at the component supply location 18 by the infeed stop mechanism 102.

Referring to FIG. 2, the empty component tray 24c is transitioned from the transition support shelf 50 to the return track assembly 14, as described above. The empty component tray 24c moving from the transition support shelf 50 actuates the switch device 108 as the component tray 24c moves thereby. Actuation of the switch device 108 causes the infeed stop mechanism 102 and the on-deck stop mechanism 104 to move from the extended configuration obstructing the supply track assembly 12 to the retracted configuration that releases the component trays 24a and 24b to translate along the supply track assembly 12.

As the component trays 24a and 24b move along the supply track assembly 12 toward the component pick location 20, the component tray 24a actuates the switch device 106 as the component tray 24a moves thereby. Actuation of the switch device 106 causes the infeed stop mechanism 102 and the on-deck stop mechanism 104 to move from the retracted configuration to the extended configuration to again obstruct the supply track assembly 12 at the on-deck location 130 where the component tray 24b is obstructed from further travel toward the component pick location 20 and the component supply location 18 where another component tray 24 with components 26 is obstructed from further travel toward the on-deck location 130. This process can continue as components 26 are removed from the component trays 24 until all component trays 24 with components 26 are removed from the component supply location 18.

The above-described flow rack assemblies supply components to an assembly line in a continuous fashion, without the use of electrical power. The flow rack assemblies utilize gravity to continuously supply the components on component trays. The flow rack assemblies include a supply track assembly and a return track assembly with a transition support shelf therebetween. The transition support shelf moves from a component pick configuration to a tray transition configuration where empty component trays are moved under only the influence of gravity from the transition support shelf to the return track assembly. A flow control system is provided that can be used to control movement of the component trays through the flow rack assembly and facilitate continuous supply of components to the component pick configuration in a reliable fashion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A flow rack assembly comprising:
    a support structure;
    a supply track assembly supported by the support structure that extends in a longitudinal direction, the supply track assembly declining in elevation from a component supply location to a component pick location;
    a return track assembly supported by the support structure that extends in the longitudinal direction, the return track assembly declining in elevation from the component pick location to a tray storage location;
    a transition support shelf rotatably connected to the support structure at a pivot location, the transition support shelf being rotatable about the pivot location due to gravity between a component pick configuration that receives component trays from the supply track assembly and a tray transition configuration that delivers component trays to the return track assembly; and
    a component tray that travels along the supply track assembly and the return track assembly, the component tray comprising a rear portion that is heavier than a front portion causing the transition support shelf to rotate about the pivot location from the component pick configuration to the tray transition configuration when located on the transition support shelf and a component is removed from the component tray.

2. The flow rack assembly of claim 1 further comprising a flow control system comprising a stop mechanism located along the supply track assembly, the stop mechanism having an extended configuration that obstructs the supply track assembly and a retracted configuration that allows movement of component trays along the supply track assembly.

3. The flow rack assembly of claim 2, wherein the flow control system comprises a switch device located along the supply track assembly that is actuated by the component tray as the component tray travels along the supply track assembly toward the component pick location, wherein actuation of the switch device moves the stop mechanism from the retracted configuration to the extended configuration.

4. The flow rack assembly of claim 3, wherein the flow control system comprises another switch device located along the return track assembly that is actuated by the component tray as the component tray travels along the return track assembly toward the tray storage location, wherein actuation of the switch device moves the stop mechanism from the extended configuration to the retracted configuration.

5. The flow rack assembly of claim 4, wherein the switch device and the another switch device comprise a pneumatic valve switch.

6. The flow rack assembly of claim 1, wherein the transition support shelf comprises rollers.

7. The flow rack assembly of claim 1 comprising one or more components located on the component tray.

8. The flow rack assembly of claim 7 comprising indicia on the component tray that provide an indication of component placement on the component tray.

9. The flow rack assembly of claim 7 comprising a positioning article extending outwardly from a support surface of the component tray to position the one or more components located on the component tray.

10. A method of supplying components for an assembly operation using a flow rack, the method comprising:
    placing components on component trays and locating the component trays with the components at a component supply location;
    directing at least one of the component trays with at least one component from the component supply location along a supply track assembly toward a component pick location using gravity; and
    redirecting the at least one component tray with the at least one component removed using a transition support shelf that is rotatably connected to a support structure at a pivot location, the transition support shelf being rotatable about the pivot location due to gravity between a component pick configuration that receives the at least one component tray from the supply track assembly and a tray transition configuration that delivers the at least one component tray to a return track assembly;
    wherein the at least one component tray comprises a rear portion that is heavier than a front portion causing the transition support shelf to rotate about the pivot location from the component pick configuration to the tray transition configuration when located on the transition support shelf and the components removed from the at least one component tray.

11. The method of claim 10 further comprising blocking the at least one component tray with the at least one component at the component supply location using a flow control system comprising a stop mechanism located along the supply track assembly, the stop mechanism having an extended configuration that obstructs the supply track assembly and a retracted configuration that allows movement of the at least one component tray along the supply track assembly.

12. The method of claim 11 further comprising actuating a switch device located along the supply track assembly using the at least one component tray as the at least one component tray travels along the supply track assembly toward the component pick location, wherein actuation of the switch device moves the stop mechanism from the retracted configuration to the extended configuration.

13. The method of claim 12 further comprising actuating another switch device located along the return track assembly using the at least one component tray as the at least one component tray travels along the return track assembly toward the tray storage location, wherein actuation of the switch device moves the stop mechanism from the extended configuration to the retracted configuration.

14. The method of claim 13, wherein the switch device and the another switch device comprise a pneumatic valve switch.

15. The method of claim 10, wherein the transition support shelf comprises rollers.

16. A flow rack assembly comprising:
    a support structure;
    a supply track assembly supported by the support structure that extends in a longitudinal direction, the supply track assembly declining in elevation from a component supply location to a component pick location;
    a return track assembly supported by the support structure that extends in the longitudinal direction, the return track assembly declining in elevation from the component pick location to a tray storage location;
    a transition support shelf rotatably connected to the support structure at a pivot location, the transition support shelf being rotatable about the pivot location due to gravity from a tray transition configuration that delivers component trays to the return track assembly to a component pick configuration that receives component trays from the supply track assembly once a component tray is removed from the transition support shelf; and
    a component tray that travels along the supply track assembly and the return track assembly, the component tray comprising a rear portion that is heavier than a front portion causing the transition support shelf to rotate about the pivot location from the component pick configuration to the tray transition configuration when located on the transition support shelf and a component is removed from the component tray.

17. The flow rack assembly of claim 16 further comprising a flow control system comprising a stop mechanism located along the supply track assembly, the stop mechanism having an extended configuration that obstructs the supply track assembly and a retracted configuration that allows movement of component trays along the supply track assembly.

18. The flow rack assembly of claim 17, wherein the flow control system comprises a switch device located along the supply track assembly that is actuated by the component tray as the component tray travels along the supply track assembly toward the component pick location, wherein actuation of the switch device moves the stop mechanism from the retracted configuration to the extended configuration.

19. The flow rack assembly of claim 18, wherein the flow control system comprises another switch device located along the return track assembly that is actuated by the component tray as the component tray travels along the return track assembly toward the tray storage location, wherein actuation of the switch device moves the stop mechanism from the extended configuration to the retracted configuration.

* * * * *